United States Patent
Yamauchi et al.

(10) Patent No.: US 10,777,813 B2
(45) Date of Patent: Sep. 15, 2020

(54) POSITIVE ELECTRODE ACTIVE MATERIAL FOR NON-AQUEOUS ELECTROLYTE SECONDARY BATTERY AND PROCESS FOR PRODUCING SAME, AND NON-AQUEOUS ELECTROLYTE SECONDARY BATTERY USING THE POSITIVE ELECTRODE ACTIVE MATERIAL

(71) Applicant: SUMITOMO METAL MINING CO., LTD., Tokyo (JP)

(72) Inventors: Mitsuru Yamauchi, Ehime (JP); Ryozo Ushio, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 221 days.

(21) Appl. No.: 15/568,741

(22) PCT Filed: Apr. 13, 2016

(86) PCT No.: PCT/JP2016/061869
§ 371 (c)(1),
(2) Date: Oct. 23, 2017

(87) PCT Pub. No.: WO2016/171051
PCT Pub. Date: Oct. 27, 2016

(65) Prior Publication Data
US 2018/0145321 A1    May 24, 2018

(30) Foreign Application Priority Data

Apr. 23, 2015    (JP) ................................ 2015-088090

(51) Int. Cl.
*H01M 4/525*    (2010.01)
*H01M 4/505*    (2010.01)
(Continued)

(52) U.S. Cl.
CPC .......... *H01M 4/525* (2013.01); *C01G 53/006* (2013.01); *C01G 53/66* (2013.01); *H01M 4/505* (2013.01);
(Continued)

(58) Field of Classification Search
CPC ...... H01M 4/525; H01M 4/505; H01M 4/366; H01M 10/0525; H01M 2004/028;
(Continued)

(56) References Cited

U.S. PATENT DOCUMENTS 6,855,461 B2 *    2/2005    Lampe-Onnerud ... H01M 4/525
429/217
6,921,609 B2 *    7/2005    Lampe-Onnerud ... H01M 4/525
423/596

(Continued)

FOREIGN PATENT DOCUMENTS

JP    2003-208895 A    7/2003
JP    2010-30808 A    2/2010
(Continued)

OTHER PUBLICATIONS

Jul. 19, 2016 International Search Report issued in International Patent Application No. PCT/JP2016/061869.

*Primary Examiner* — Laura Weiner
(74) *Attorney, Agent, or Firm* — Oliff PLC

(57) ABSTRACT

A positive electrode active material for non-aqueous electrolyte secondary battery with improved cycle characteristics and high temperature storage characteristics, without impairing an advantage of high capacity which lithium nickel composite oxide inherently possesses. The positive electrode active material for non-aqueous electrolyte secondary battery includes lithium nickel composite oxide represented by a general formula (1): $Li_{1+u}Ni_{1-x-y-z}Co_xMn_yMg_zO_2$ (However, u, x, y and z in the formula satisfies (Continued)

$0.015 \leq u \leq 0.030$, $0.05 \leq x \leq 0.20$, $0.01 \leq y \leq 0.10$, $0.01 \leq z \leq 0.05$, $0.10 \leq x+y+z \leq 0.25$.), and wherein crystallite diameter is 100 nm to 130 nm. In addition, the positive electrode active material for non-aqueous electrolyte secondary battery is produced at least by an oxidation roasting step, a mixing step, and a calcining step.

10 Claims, 3 Drawing Sheets

(51) Int. Cl.
  *C01G 53/00* (2006.01)
  *H01M 4/36* (2006.01)
  *H01M 10/0525* (2010.01)
  *H01M 4/02* (2006.01)

(52) U.S. Cl.
  CPC ...... *C01P 2002/50* (2013.01); *C01P 2002/60* (2013.01); *C01P 2004/61* (2013.01); *C01P 2006/40* (2013.01); *H01M 4/366* (2013.01); *H01M 10/0525* (2013.01); *H01M 2004/021* (2013.01); *H01M 2004/028* (2013.01); *H01M 2220/30* (2013.01)

(58) Field of Classification Search
  CPC ........ H01M 2004/021; H01M 2220/30; C01G 53/66; C01P 2002/50; C01P 2002/60; C01P 2004/61; C01P 2006/40
  See application file for complete search history.

(56) References Cited

U.S. PATENT DOCUMENTS

| | | |
|---|---|---|
| 2011/0269018 A1 | 11/2011 | Kono et al. |
| 2012/0321948 A1 | 12/2012 | Oya et al. |
| 2015/0188134 A1 | 7/2015 | Kameyama et al. |
| 2015/0249248 A1* | 9/2015 | Ishizaki ................ H01M 4/525 |
| | | 429/223 |
| 2017/0069911 A1* | 3/2017 | Volkov ................ H01M 4/525 |

FOREIGN PATENT DOCUMENTS

| | | |
|---|---|---|
| JP | 2011-060541 A | 3/2011 |
| JP | 2012-014851 A | 1/2012 |
| JP | 2012-230898 A | 11/2012 |
| JP | 2014-238976 A | 12/2014 |
| WO | 2010/147179 A1 | 12/2010 |
| WO | 2011/105126 A1 | 9/2011 |
| WO | 2014/051148 A1 | 4/2014 |
| WO | WO 2015/1282219 * | 9/2015 |

* cited by examiner

POSITIVE ELECTRODE ACTIVE MATERIAL FOR NON-AQUEOUS ELECTROLYTE SECONDARY BATTERY AND PROCESS FOR PRODUCING SAME, AND NON-AQUEOUS ELECTROLYTE SECONDARY BATTERY USING THE POSITIVE ELECTRODE ACTIVE MATERIAL

BACKGROUND OF THE INVENTION

Field of the Invention

The present invention relates to a positive electrode active material for non-aqueous electrolyte secondary battery comprising nickel composite oxide as raw material and process for producing same, and a non-aqueous electrolyte secondary battery using the positive electrode active material. This application is based upon and claims the benefit of priority from prior Japanese Patent Application No. 2015-088090 filed on Apr. 23, 2015 in Japan, which is incorporated by reference herein.

Description of Related Art

In recent years, there has been a strong demand for the development of compact and lightweight secondary batteries having a high energy density due to the widespread use of portable electronic devices such as mobile phones and notebook computers, and as such secondary batteries, there is non-aqueous electrolyte secondary battery. For a positive electrode material of non-aqueous electrolyte secondary battery, lithium metal composite oxide is used as a positive electrode active material. As representative example of non-aqueous electrolyte secondary battery, there is lithium ion secondary battery, and lithium cobalt composite oxide is used for lithium ion secondary battery.

However, lithium cobalt composite oxide uses rare and expensive cobalt compound as raw material, so it has been a cause for increase in cost of a positive electrode material and lithium ion secondary battery. From a point of view of achieving further weight reduction and miniaturization of portable electronic devices, it is necessary to enable production of more inexpensive lithium ion secondary battery by decreasing cost of the positive electrode active material.

Therefore, as an alternative of lithium cobalt composite oxide, it is proposed to use lithium nickel composite oxide using nickel, which is more inexpensive than cobalt, as positive electrode active material. Lithium nickel composite oxide indicates high battery voltage as well as lithium cobalt composite oxide, and also, indicates lower electrochemical potential than lithium cobalt composite oxide, and dissolution by oxidation of electrolytic solution is difficult to be a problem, so it is expected as the positive electrode active material enabling high capacity of the secondary battery, and research and development have been carried out actively.

However, lithium ion secondary battery is having a problem of cycle characteristics that battery capacity will be decreased gradually by repeating charge and discharge, or having a problem of high temperature storage characteristics that battery capacity will also be decreased when it is placed in harsh environment such as high temperature. This is caused by a change of crystal structure of the positive electrode active material, by movement of lithium in the secondary battery and by desorption and insertion of lithium in the positive electrode active material.

Therefore, the positive electrode active material with improved high temperature storage characteristics by stabilizing crystal structure by adding magnesium is proposed (Refer to Patent Literatures 1 and 2.). However, by these proposals, they are having a problem that battery capacity will be decreased as lithium content is decreased for stabilizing high temperature storage characteristics.

On the other hand, it is proposed to improve high temperature storage characteristics by carrying alkaline metal or alkaline earth metal element other than lithium on a surface of the positive electrode active material (Refer to Patent Literature 3.). However, this proposal is for a purpose of generating gas at the time of high temperature storage, so it will not inhibit a change of crystal structure. In addition, also in this proposal, lithium content is decreased, so not only that battery capacity will be decreased, but also a surface treatment step for positive electrode active particles will be added, so there is a defect that number of steps will be increased when it is mass produced.

In addition, the positive electrode active material, which is increased of amphoteric metal element concentration of particle surface, by water washing the positive electrode active material at prescribed pH and annealing it, is proposed (Refer to Patent Literature 4.). According to this proposal, it is described that it is possible to achieve both high temperature storage characteristics and cycle characteristics, but the amount of nickel or cobalt, which contributes to charge and discharge, of the positive electrode active material surface is decreased, so not only that decrease of battery capacity can be predicted, but also there is a problem that number of steps will be increased when it is mass produced.

Patent Literature 1: JP 2012-014851 A
Patent Literature 2: JP 2003-208895 A
Patent Literature 3: JP 2011-060541 A
Patent Literature 4: JP 2012-230898 A

SUMMARY OF THE INVENTION

The present invention is proposed considering the above problems, and purpose of the present invention is to provide a positive electrode active material for non-aqueous electrolyte secondary battery with improved cycle characteristics and high temperature storage characteristics, without impairing an advantage of high capacity which lithium nickel composite oxide inherently possesses.

As a result of keen examination regarding improvement of battery characteristic of lithium nickel composite oxide, the inventors have reached to the present invention by obtaining a knowledge that it is possible to achieve both high capacity and cycle characteristics and high temperature storage characteristics, as it will be a positive electrode active material for non-aqueous electrolyte secondary battery having specific crystallite diameter, by controlling calcining temperature and excess amount of lithium when obtaining lithium nickel composite oxide.

In other words, the positive electrode active material for non-aqueous electrolyte secondary battery of the present invention is a positive electrode active material for non-aqueous electrolyte secondary battery comprising lithium nickel composite oxide, wherein lithium nickel composite oxide is represented by a general formula (1): $Li_{1+u}Ni_{1-x-y-z}Co_xMn_yMg_zO_2$ (However, u, x, y and z in the formula satisfies $0.015 \leq u \leq 0.030$, $0.05 \leq x \leq 0.20$, $0.01 \leq y \leq 0.10$, $0.01 \leq z \leq 0.05$, $0.10 \leq x+y+z \leq 0.25$.), and wherein crystallite diameter is 100 nm to 130 nm.

In the positive electrode active material for non-aqueous electrolyte secondary battery of the present invention, it is preferable that lithium nickel composite oxide comprises primary particles having layered structure and secondary particles composed of aggregated primary particles.

In the positive electrode active material for non-aqueous electrolyte secondary battery of the present invention, it is preferable that an average particle diameter is 5 μm to 20 μm on a volume basis by laser diffraction scattering method.

A process for producing a positive electrode active material for non-aqueous secondary battery of the present invention comprises: an oxidation roasting step for obtaining nickel composite oxide by oxidation roasting nickel composite hydroxide represented by a general formula (2): $Ni_{1-a-b-c}Co_aMn_bMg_c(OH)_2$ (However, a, b and c in the formula satisfies 0.05≤a≤0.20, 0.01≤b≤0.10, 0.01≤c≤0.05, 0.10≤a+b+c≤0.25.) at temperature of 300° C. to 500° C. in an oxidizing atmosphere; a mixing step for obtaining lithium mixture in which a ratio (Li/Me) of a number of atoms of lithium (Li) to a sum of number of atoms of nickel, cobalt, manganese and magnesium (Me) is 1.015 to 1.030, by mixing nickel composite oxide obtained in the oxidation roasting step with lithium compound; and a calcining step for obtaining lithium nickel composite oxide by calcining lithium mixture obtained in the mixing step at temperature of 720° C. to 780° C. in an oxidizing atmosphere.

In the process for producing a positive electrode active material for non-aqueous secondary battery of the present invention, it is preferable to comprise a crystallization step for obtaining nickel composite hydroxide by neutralization crystallization, by mixing alkaline aqueous solution with metal salt aqueous solution including nickel, cobalt, manganese and magnesium, before the oxidation roasting step.

In the process for producing a positive electrode active material for non-aqueous secondary battery of the present invention, it is preferable to prepare mixed aqueous solution by mixing metal salt aqueous solution including nickel, cobalt, manganese and magnesium in advance and to mix obtained mixed aqueous solution with alkaline aqueous solution in the crystallization step, and also, it is preferable to use lithium hydroxide, lithium carbonate or a mixture thereof as lithium compound in the mixing step.

Non-aqueous electrolyte secondary battery of the present invention is characterized in that it is having a positive electrode comprising the above positive electrode active material for non-aqueous electrolyte secondary battery.

According to the present invention, it is possible to obtain a positive electrode active material for non-aqueous electrolyte secondary battery with improved cycle characteristics and high temperature storage characteristics, without impairing an advantage of high capacity which lithium nickel composite oxide inherently possesses.

DETAILED DESCRIPTION OF THE INVENTION

Figure 1:
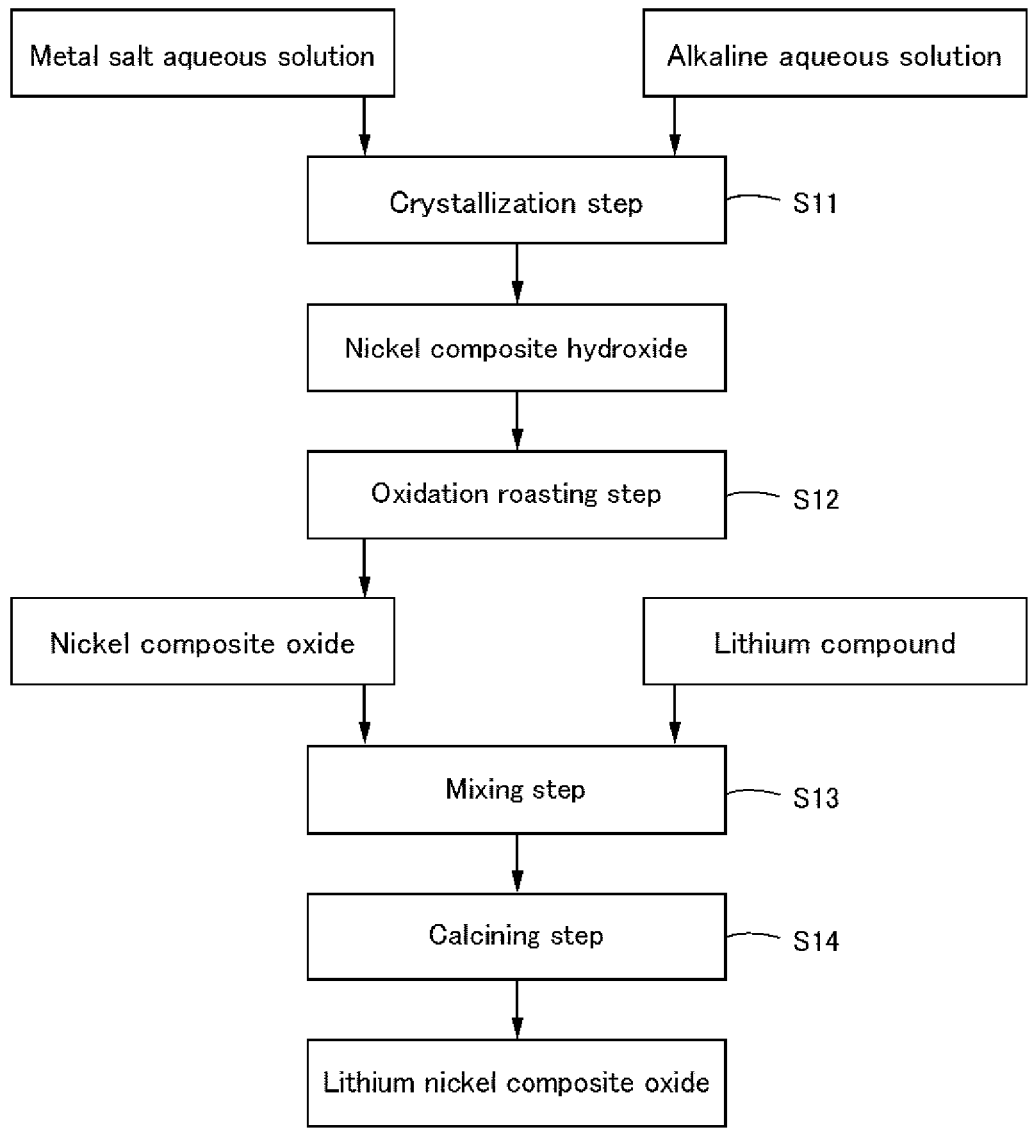
FIG. 1 is a flow chart illustrating a process for producing lithium nickel composite oxide applying the present invention.

Explaining in detail about concrete embodiments applying the present invention (Hereinafter, referred to as "present embodiment".) along with the following items and by referring to drawings. In addition, the present invention should not be limited by the following embodiments and these embodiments can be modified in various ways without departing from the gist of the present invention.

1. Positive electrode active material for non-aqueous electrolyte secondary battery
   1-1. Composition
   1-2. Crystallite diameter
2. Process for producing positive electrode active material for non-aqueous electrolyte secondary battery
   2-1. Nickel composite hydroxide
   2-2. Process for producing nickel composite hydroxide
   2-3. Oxidation roasting step
   2-4. Mixing step
   2-5. Calcining step
3. Non-aqueous electrolyte secondary battery
   3-1. Component
   3-1-a. Positive electrode
   3-1-b. Negative electrode
   3-1-c. Separator
   3-1-d. Non-aqueous electrolytic solution
   3-2. Form
   3-3. Characteristic
   3-4. Intended use

[1. Positive Electrode Active Material for Non-Aqueous Electrolyte Secondary Battery]

Positive electrode active material for non-aqueous electrolyte secondary battery relating to the present embodiment (Hereinafter, referred to simply as "positive electrode active material".) comprises lithium nickel composite oxide.

In recent years, there has been a strong demand for the development of compact and lightweight secondary batteries having a high energy density due to the widespread use of portable electronic devices, and as such secondary batteries, there is non-aqueous electrolyte secondary battery, and for a positive electrode material of non-aqueous electrolyte secondary battery, lithium metal composite oxide is used as a positive electrode active material. As representative example of non-aqueous electrolyte secondary battery, there is lithium ion secondary battery, and lithium cobalt composite oxide is used for lithium ion secondary battery.

A synthesis of lithium cobalt composite oxide is relatively easy, and also, lithium ion secondary battery (Hereinafter, it may be called simply as "secondary battery".) using lithium cobalt composite oxide as a positive electrode material can obtain high voltage of 4V grade, so lithium cobalt composite oxide is practically used as a material for achieving the secondary battery with high energy density. Regarding lithium cobalt composite oxide, research and development for achieving excellent initial capacity characteristics or cycle characteristics in the secondary battery have been progressing, and various results have been obtained already.

However, lithium cobalt composite oxide uses rare and expensive cobalt as raw material, so it has been a cause for increase in cost of the positive electrode material and the secondary battery. A unit cost per capacity of the secondary battery using lithium cobalt composite oxide is about four times expensive than that of nickel hydrogen battery, so applicable intended use is considerably limited. Therefore, from a point of view of achieving further weight reduction and miniaturization of portable electronic devices, it is necessary to enable production of more inexpensive lithium ion secondary battery by decreasing cost of the positive electrode active material.

Here, in the present embodiment, lithium nickel composite oxide using nickel, which is more inexpensive than cobalt, is used as one of positive electrode active material, which can replace lithium cobalt composite oxide. Lithium nickel composite oxide indicates high battery voltage as well as lithium cobalt composite oxide, and also, indicates lower electrochemical potential than lithium cobalt composite oxide, and dissolution by oxidation of electrolytic solution is difficult to be a problem, so it is expected as the positive electrode active material enabling high capacity of the secondary battery.

In the positive electrode active material, cycle characteristics when used in the secondary battery is improved by making the excess amount of lithium higher, and also, high temperature storage characteristics is improved by addition of magnesium. Further, in the positive electrode active material, it is obtaining high charge and discharge capacity by making crystallite diameter to be in specific range. In other words, the positive electrode active material achieves high capacity and achieves both cycle characteristics and high temperature storage characteristics at a high level, by controlling crystallite diameter and excess amount of lithium, and by addition of magnesium. Hereinafter, explaining in detail about the positive electrode active material.

(1-1. Composition)

The positive electrode active material includes lithium nickel composite oxide represented by a general formula (1): $Li_{1+u}Ni_{1-x-y-z}Co_xMn_yMg_zO_2$ (However, u, x, y and z in the formula satisfies $0.015 \leq u \leq 0.030$, $0.05 \leq x \leq 0.20$, $0.01 \leq y \leq 0.10$, $0.01 \leq z \leq 0.05$, $0.10 \leq x+y+z \leq 0.25$.).

Here, u indicating excess amount of lithium (Li) is necessary to be $0.015 \leq u \leq 0.030$, and as a result, it is possible to obtain high capacity and good cycle characteristics when it is used in the secondary battery. It is possible to obtain capacity of the secondary battery even when u is less than 0.015, however, the amount of Li is insufficient, so it is not possible to obtain good cycle characteristics. On the other hand, when u is more than 0.030, cation mixing (site exchange of lithium and dissimilar metal ion) occurs in the calcining step S14 (Refer to FIG. 1.) when producing lithium nickel composite oxide, and performance of the secondary battery decreases. Especially, the positive electrode active material is having a composition including manganese, so valence of nickel included in the positive electrode active material changes from trivalence to bivalence, so cation mixing tends to occur. Therefore, in the positive electrode active material, it is inhibiting the occurrence of cation mixing by controlling the excess amount of Li.

Magnesium (Mg) is an element to stabilize a crystal structure, and high temperature storage characteristics of the positive electrode active material improves by stabilization of crystal structure. Here, z indicating addition amount of Mg is necessary to be $0.01 \leq z \leq 0.05$, and when z is less than 0.01, an effect for stabilizing crystal is low, and improvement of high temperature storage characteristics is insufficient. On the other hand, when z is more than 0.05, Mg not contributing to charge and discharge increases, so battery capacity decreases.

Cobalt (Co) is an element to improve cycle characteristics, and manganese (Mn) is an element indicating heat stability. Here, x and y indicating addition amount of Co and Mn are necessary to be $0.05 \leq x \leq 0.20$ and $0.01 \leq y \leq 0.10$ respectively. By limiting addition amount of Co and Mn in prescribed range, it is possible to obtain effect to improve cycle characteristics and to improve heat stability, and also, it is possible to inhibit decrease of battery capacity by excessive addition amount.

All of Co, Mn and Mg included in the positive electrode active material decreases battery capacity when addition amount thereof becomes excessive, so it is possible to achieve both battery capacity and effect of addition of each element by limiting x, y and z to be $0.10 \leq x+y+z \leq 0.25$.

In addition, in the positive electrode active material, element other than Co, Mn and Mg may be added, in order to improve battery characteristic of the secondary battery using the positive electrode active material. For example, more than one element selected from Ca, Al, Ti, V, Cr, Zr, Nb, Mo and W may be added for 10 atom % with respect to sum of Co, Mn and Mg.

(1-2. Crystallite Diameter)

Crystallite diameter of the positive electrode active material is 100 nm to 130 nm (1000 Å to 1300 Å), preferably 110 nm to 130 nm (1100 Å to 1300 Å). In the positive electrode active material, by making crystallite diameter to be 100 nm to 130 nm, it is possible to increase crystallinity of lithium nickel composite oxide composing the positive electrode active material, and also, it is possible to increase ratio of contact with electrolytic solution by increasing gaps or grain boundaries into which electrolytic solution of the secondary battery is permeable. In addition, in the positive electrode active material, it is possible to increase battery capacity by high crystallinity and increase of ratio of contact with electrolytic solution.

When crystallite diameter of the positive electrode active material is less than 100 nm, not only that it is not possible to obtain high battery capacity as crystal growth is insufficient, but also, characteristics other than battery capacity is decreased. On the other hand, when crystallite diameter is more than 130 nm, not only battery capacity decreases, but also, cycle characteristics decreases by increase of cutting of conductive paths by decrease of contact point of primary particles themselves, or by crack by volumetric expansion and shrinkage at the time of charge and discharge.

In the positive electrode active material, it is preferable to include lithium nickel composite oxide consisting of primary particles having layered structure and secondary particles composed of aggregated primary particles, in order to obtain higher battery capacity and cycle characteristics. Further, in the positive electrode active material, it is preferable to make an average particle diameter to be 5 μm to 20 μm on a volume basis by laser diffraction scattering method, in order to obtain high filling characteristic when forming the positive electrode of the secondary battery.

[2. Process for Producing Positive Electrode Active Material for Non-Aqueous Electrolyte Secondary Battery]

As illustrated in FIG. 1, a process for producing positive electrode active material for non-aqueous electrolyte secondary battery relating to the present embodiment (Hereinafter, referred simply as "process for producing positive electrode active material".) comprises at least an oxidation roasting step S12, a mixing step S13 and a calcining step S14. In the oxidation roasting step S12, nickel composite oxide is obtained by oxidation roasting nickel composite hydroxide in prescribed condition. In the mixing step S13, lithium mixture is obtained by mixing nickel composite oxide obtained in the oxidation roasting step S12 and lithium compound in prescribed condition. In the calcining step S14, lithium nickel composite oxide is obtained by calcining lithium mixture obtained in the mixing step S13 in prescribed condition. In other words, in the process for producing positive electrode active material, it is possible to produce the positive electrode active material for non-aqueous electrolyte secondary battery including lithium nickel composite oxide, at least by performing the above each step. Hereinafter, explaining in detail per step about the process for producing positive electrode active material.

(2-1. Nickel Composite Hydroxide)

Nickel composite hydroxide used in the process for producing positive electrode active material is represented by a general formula (2): $Ni_{1-a-b-c}Co_aMn_bMg_c(OH)_2$ (However, a, b and c in the formula satisfies $0.05 \leq a \leq 0.20$, $0.01 \leq b \leq 0.10$, $0.01 \leq c \leq 0.05$, $0.10 \leq a+b+c \leq 0.25$.).

(2-2. Process for Producing Nickel Composite Hydroxide)

As illustrated in FIG. 1, in the process for producing positive electrode active material, it is preferable to comprise a crystallization step S11 for obtaining nickel composite hydroxide by neutralization crystallization, by mixing alkaline aqueous solution and metal salt aqueous solution including nickel, cobalt, manganese and magnesium, before the following oxidation roasting step S12, in order to obtain nickel composite hydroxide with uniform composition.

The composition of nickel composite hydroxide obtained by neutralization crystallization is uniform, and further, the control of powder properties such as particle diameter or shape, is easy. The powder properties of lithium nickel composite oxide obtained by the following calcining step S14 are approximately inherited from nickel composite hydroxide, which is a raw material. Therefore, in the process for producing positive electrode active material, it is preferable to adjust the powder properties of nickel composite hydroxide by the crystallization step S11. For example, in the crystallization step S11, it is preferable to control such that average particle diameter of nickel composite hydroxide will be 5 μm to 20 μm on a volume basis by laser diffraction scattering method.

Neutralization crystallization may be performed by publicly known process, for example, particles of nickel composite hydroxide can be obtained by neutralization crystallization, by dripping ammonia aqueous solution and metal salt aqueous solution including nickel, cobalt, manganese and magnesium into a reaction vessel heated to certain temperature, and by dripping sodium hydroxide aqueous solution such that pH of solution in the reaction vessel will be constant at that time.

In the crystallization step S11, each aqueous solution may be dripped into the reaction vessel separately by using aqueous solutions including respective metal salt as metal salt aqueous solution, but it is preferable to drip it as mixed aqueous solution previously mixed with metal salts to be a composition of aimed metal element, in order to make the composition more uniform.

In the crystallization step S11, nickel composite hydroxide in the reaction vessel obtained by neutralization crystallization is dried after solid-liquid separation. Here, it is preferable to wash obtained nickel composite hydroxide by water before drying, in order to remove impurities. When drying nickel composite hydroxide, it is not always necessary to dry at high temperature as it is sufficient if moisture is removed to the extent that operation in the following steps will be easy.

Drying temperature in the crystallization step S11 is not limited particularly, but it is preferable that it is 100° C. or more and 200° C. or less. When drying temperature is less than 100° C., it requires long time for removing residual moisture, and when drying temperature is more than 200° C., it requires a lot of energy, so it is not industrially appropriate that drying temperature exceeds the above range. On the other hand, drying in the crystallization step S11 may be performed continuously with the oxidation roasting step S12.

In addition, when drying nickel composite hydroxide in the crystallization step S11, drying time is not limited particularly, and it is sufficient if moisture is removed to the extent that operation in the following steps will be easy.

(2-3. Oxidation Roasting Step)

As illustrated in FIG. 1, the oxidation roasting step S12 is a step for obtaining nickel composite oxide by oxidation roasting nickel composite hydroxide represented by the general formula (2) at temperature of 300° C. to 500° C. in oxidizing atmosphere. In addition, nickel composite hydroxide used in the oxidation roasting step S12 is not limited particularly as long as its composition is represented by the general formula (2).

In the oxidation roasting step S12, it is possible to control crystallinity of lithium nickel composite oxide obtained in the following steps by controlling primary particles of obtained nickel composite oxide, by oxidation roasting nickel composite hydroxide while controlling temperature. In other words, nickel composite oxide comprising fine primary particles and secondary particles with large surface area can be obtained by previously oxidation roasting nickel composite hydroxide at temperature of 300° C. to 500° C. in oxidizing atmosphere, and reactivity with lithium compound can be increased. As a result, it is possible to make crystallite diameter of lithium nickel composite oxide to be 100 nm to 130 nm in the following calcining step S14.

In the oxidation roasting step S12, it is possible to reduce amount of moisture in nickel composite oxide to be constant by oxidation roasting nickel composite hydroxide to be nickel composite oxide, and it is possible to stabilize composition ratio of lithium and metal element when mixing nickel composite oxide with lithium compound in the following mixing step S13.

When oxidation roasting temperature is less than 300° C., there is a possibility that a part of nickel composite hydroxide will be remained, so it is not possible to increase reactivity with lithium compound as composition ratio of lithium and metal element is not stable. On the other hand, when oxidation roasting temperature is more than 500° C., primary particles grow and surface area of secondary particles will be decreased, and reactivity with lithium compound will be deteriorated.

Atmosphere of oxidation roasting may be any oxidizing atmosphere, but from a point of view of cost and handling property, air atmosphere is preferable. Further, in the oxidation roasting step S12, it is preferable to supply sufficient flow rate of atmosphere gas into reaction system, in order to discharge water vapor generated at the time of oxidation roasting to outside the reaction system. Therefore, it is preferable that oxidation roasting of nickel composite hydroxide is performed in air stream having sufficient flow rate.

Oxidation roasting time is not limited particularly, but it is preferable to be one hour or more, more preferably 5 hours to 15 hours, in order to convert nickel composite hydroxide into nickel composite oxide.

(2-4. Mixing Step)

As illustrated in FIG. 1, the mixing step S13 is a step for obtaining lithium mixture in which a ratio (Li/Me) of a number of atoms of lithium (Li) to a sum of number of atoms of nickel, cobalt, manganese and magnesium (Me) is 1.015 to 1.030, by mixing nickel composite oxide obtained in the oxidation roasting step S12 with lithium compound With respect to Li/Me, Li/Me of lithium mixture obtained in the mixing step S13 will be Li/Me of lithium nickel composite oxide, and there is almost no change before and after the calcining step S14. Therefore, in the mixing step S13, it is mixed such that Li/Me of lithium mixture will be as same as Li/Me of lithium nickel composite oxide to be obtained. In other words, in the mixing step S13, nickel composite oxide and lithium compound is mixed such that a value of u in the general formula (1) representing a composition of lithium nickel composite oxide will be $0.015 \leq u \leq 0.030$.

Lithium compound is not limited particularly, and for example, lithium hydroxide, lithium nitrate, lithium carbonate, or mixture thereof is preferable as they are easily available. In the mixing step S13, especially considering stability of quality, uniformity of mixture, and calcining temperature, it is preferable to use lithium hydroxide, lithium carbonate, or mixture thereof, and it is more preferable to use lithium hydroxide.

In the mixing step S13, when mixing nickel composite oxide with lithium compound, it is sufficient that they are mixed uniformly to the extent that shape of nickel composite oxide will not be destroyed, so standard mixer can be used. As such mixer, shaker mixer, Loedige mixer, Julia mixer, V blender or the like can be used.

(2-5. Calcining Step)

The calcining step S14 is a step for obtaining lithium nickel composite oxide by calcining lithium mixture obtained in the mixing step S13 at temperature of 720° C. to 780° C. in oxidizing atmosphere. In the calcining step S14, it is possible to obtain lithium nickel composite oxide with crystallite diameter of 100 nm to 130 nm, while inhibiting cation mixing, by setting calcining temperature to be 720° C. to 780° C.

When calcining temperature is less than 720° C., diffusion of lithium does not proceed sufficiently, and excessive lithium will be remained, and crystal structure will not be in good order, so it is not possible to obtain sufficient characteristic when it is used for battery. On the other hand, when calcining temperature is more than 780° C., cation mixing occurs, and it is not possible to obtain sufficient battery performance.

In the calcining step S14, calcining time may be any time that nickel composite oxide and lithium compound reacts sufficiently, but it is preferable that a time to be maintained at calcining temperature is two hours or more, more preferably 3 hours to 24 hours. When the time to be maintained at calcining temperature is less than two hours, lithium will not be diffused sufficiently in nickel composite oxide, so excess lithium or unreacted nickel composite oxide may be remained, and crystallinity of obtained lithium nickel composite oxide may be decreased.

In addition, in the calcining step S14, from a point of view of reacting nickel composite oxide and lithium compound uniformly, it is preferable to rise to the calcining temperature with temperature rising rate of 1° C./min to 5° C./min. Further, in the calcining step S14, it is possible to perform reaction more uniformly by maintaining at temperature near melting point of lithium compound for about 1 hour to 10 hours.

Atmosphere at the time of calcining may be any oxidizing atmosphere, but it is preferable to be atmosphere with oxygen concentration of 18 volume % to 100 volume %, especially it is preferable to be mixed atmosphere of inert gas and oxygen with the above oxygen concentration. In other words, in the calcining step S14, it is preferable that calcining of lithium mixture is performed in air or oxygen stream. When oxygen concentration is less than 18 volume %, crystallinity of lithium nickel composite oxide may be decreased.

Furnace to be used in the calcining step S14 is not limited particularly, and any furnace may be used as long as it can heat lithium mixture in air or oxygen stream. However, in the calcining step S14, from a point of view of maintaining atmosphere uniformly in the furnace, an electric furnace without occurrence of gas is preferable, and either batch type electric furnace or continuous electric furnace can be used suitably. In addition, also in the oxidation roasting step S12, it is preferable to use batch type electric furnace or continuous electric furnace, from same point of view as the calcining step S14.

Lithium nickel composite oxide obtained by the calcining step S14 may be occurring aggregation or minor sintering. In such cases, it is preferable to disintegrate sintered body or aggregate of lithium nickel composite oxide. In the calcining step S14, by performing such operation, it is possible to adjust average particle diameter and particle size distribution of obtained positive electrode active material to be in suitable range. In addition, disintegration means an operation to loosen aggregate by separating secondary particles almost without destroying secondary particle itself, by charging mechanical energy to aggregate composed of plurality of secondary particles generated by sintering necking between secondary particles or the like at the time of calcining.

As a process for disintegration, publicly known means can be used, and for example, pin mill, hammer mill and else can be used. In addition, when disintegrating sintered body or aggregate of lithium nickel composite oxide, it is preferable to adjust power of disintegration in an appropriate range, in order not to destroy secondary particles.

Therefore, as illustrated in FIG. 1, a process for producing a positive electrode active material for non-aqueous electrolyte secondary battery relating to the present embodiment at least comprises: a oxidation roasting step S12; a mixing step S13; and a calcining step S14, and by performing each step, it is possible to produce the positive electrode active material for non-aqueous electrolyte secondary battery including lithium nickel composite oxide, which achieves high capacity and achieves both cycle characteristics and high temperature storage characteristics at a high level. In addition, a process for producing the positive electrode active material for non-aqueous electrolyte secondary battery does not add a surface treatment step for positive electrode active material particles, so there is no need to increase number of steps by mass production as in conventional process, and it does not hinder its productivity as it is easy even in industrial scale, so it can be said that its industrial value is extremely high.

[3. Non-Aqueous Electrolyte Secondary Battery]

Non-aqueous electrolyte secondary battery relating to the present embodiment comprises similar components as standard non-aqueous electrolyte secondary battery such as positive electrode, negative electrode, separator, and non-aqueous electrolytic solution. In addition, non-aqueous electrolyte secondary battery explained in below is only indicating an example of the secondary battery, and it is possible to perform various modifications and improvements to the secondary battery.

(3-1. Components)

<3-1-a. Positive Electrode>

Here, a positive electrode of non-aqueous electrolyte secondary battery is produced, for example, according to the following procedure, by using the positive electrode active material for non-aqueous electrolyte secondary battery obtained by the process for producing the positive electrode active material for non-aqueous electrolyte secondary battery relating to the present embodiment.

At first, the positive electrode active material in powder shape obtained as mentioned above is mixed with conductive material and binding agent, and further, solvent such as viscosity modifier or activated carbon is added according to need, and these materials are kneaded to produce positive electrode mixture paste. Mixing ratio of each raw material in positive electrode mixture paste will be an important factor for determining a performance of non-aqueous electrolyte secondary battery. For example, when solid content (positive electrode mixture) in positive electrode mixture paste excluding solvent is 100 parts by mass, it is possible to adjust content of positive electrode active material to 60 to 95 parts by mass, and to adjust content of conductive material to 1 to 20 parts by mass, and to adjust content of binding agent to 1 to 20 parts by mass, as well as positive electrode of standard non-aqueous electrolyte secondary battery.

Next, obtained positive electrode mixture paste is applied, for example on surface of current collector made of aluminum foil, and dried to scatter solvent. In addition, it may be pressed by roll press or the like, in order to increase electrode density according to need. As such, sheet-like positive electrode can be produced. The sheet-like positive electrode can be provided for production of battery by cutting or the like into appropriate size according to aimed battery. However, a process for producing positive electrode is not limited to the above process, and other process may be used.

As conductive material, it is possible to use, for example graphite such as natural graphite, artificial graphite or expanded graphite, or carbon black material such as acetylene black or Ketjen black.

Binding agent serves a function to bind positive electrode active material particles. As binding agent, it is possible to use, for example polyvinylidene fluoride (PVDF), polytetrafluoroethylene (PTFE), fluororubber, ethylene propylene diene rubber, styrene butadiene, cellulose resin, polyacrylic acid or the like.

In addition, as mentioned above, it is possible to prepare positive electrode mixture paste by adding solvent for dissolving binding agent to positive electrode mixture dispersed with positive electrode active material, conductive material and binding agent. As solvent, it is possible to use organic solvent such as N-methyl-2-pyrrolidone concretely. In addition, in positive electrode mixture, it is possible to add activated carbon, in order to increase electric double layer capacity.

<3-1-b. Negative Electrode>

Negative electrode mixture in the form of paste is prepared by mixing binding agent to negative electrode active material such as metal lithium, lithium alloy, or material capable of occluding and desorbing lithium ion, and by adding appropriate solvent, and negative electrode mixture paste is applied on surface of metal foil current collector such as copper, and dried, and compressed to increase electrode density according to need to form negative electrode to be used.

As negative electrode active material, it is possible to use, for example: material including lithium such as metal lithium or lithium alloy; material capable of occluding and desorbing lithium ion such as natural graphite or artificial graphite; organic compound calcined body such as phenol resin; and powder body of carbon material such as coke.

As binding agent to be used for negative electrode, it is possible to use fluorine containing resin such as PVDF, as well as binding agent used for positive electrode. In addition, as solvent for dispersing the above negative electrode active material and binding agent, it is possible to use organic solvent such as N-methyl-2-pyrrolidone.

<3-1-c. Separator>

Separator is arranged to be interposed between positive electrode and negative electrode, and it is having a function to retain electrolyte by separating positive electrode and negative electrode. As such separator, it is possible to use, for example thin film of polyethylene, polypropylene or the like having numerous fine holes, but it is not limited particularly as long as it is a porous thin film having a function to separate both electrodes and a function to retain electrolyte.

<3-1-d. Non-Aqueous Electrolytic Solution>

Non-aqueous electrolytic solution is electrolytic solution dissolving lithium salt in organic solvent as supporting salt.

As organic solvent, it is possible to use one kind solely or by mixing two kinds or more selected from, for example: cyclic carbonate such as ethylene carbonate, propylene carbonate, butylene carbonate, or trifluoro propylene carbonate; chain carbonate such as diethyl carbonate, dimethyl carbonate, ethyl methyl carbonate, or dipropyl carbonate; ether compound such as tetrahydrofuran, 2-methyl tetrahydrofuran, or dimethoxyethane; sulfur compound such as ethyl methyl sulfone or butane sultone; and phosphor compound such as triethyl phosphate or trioctyl phosphate.

As supporting salt, it is possible to use $LiPF_6$, $LiBF_4$, $LiClO_4$, $LiAsF_6$, $LiN(CF_3SO_2)_2$ and combined salt thereof.

Further, non-aqueous electrolytic solution may include radical scavenger, surfactant, flame retardant or the like.

(3-2. Form)

Non-aqueous electrolyte secondary battery composed of positive electrode, negative electrode, separator and non-aqueous electrolytic solution as explained in the above can be formed in various shapes such as cylindrical or layered shape.

Even when non-aqueous electrolyte secondary battery is adopting any shape, positive electrode and negative electrode are laminated via separator to form electrode body, and obtained electrode body is impregnated with non-aqueous electrolytic solution, and positive electrode current collector and positive electrode terminal communicating to outside, and also, negative electrode current collector and negative electrode terminal communicating to outside are connected using current collecting lead, and battery case is sealed to complete non-aqueous electrolyte secondary battery.

(3-3. Characteristic)

Non-aqueous electrolyte secondary battery is using the above positive electrode active material as positive electrode material, so it is excellent in capacity characteristics, cycle characteristics and high temperature storage characteristics. Also, it can be said that non-aqueous electrolyte secondary battery is excellent in heat stability and safety, even compared with secondary battery using positive electrode active material composed of conventional lithium nickel oxide.

(3-4. Intended Use)

As mentioned above, non-aqueous electrolyte secondary battery is excellent in capacity characteristics, cycle characteristics and high temperature storage characteristics, and it can be used suitably for power source of compact portable electronic devices such as notebook computer or mobile phone terminal, which requires these characteristics at a high level. In addition, non-aqueous electrolyte secondary battery is also excellent in safety, and not only that miniaturization and high output can be achieved, but also it is possible to simplify expensive protection circuit, so it can be used suitably as power source of transport equipment in which loading space is restricted.

EXAMPLES

Hereinafter, the present invention will be described in more detail with reference to examples and comparative examples, but the present invention is not limited to these examples. In addition, if it is not stated particularly, in each of examples and comparative examples here, a positive electrode active material and non-aqueous electrolyte secondary battery were produced using special grade reagents manufactured by Wako Pure Chemical Industries, Ltd to each sample.

Example 1

<1. Production and Evaluation of Positive Electrode Active Material>

In example 1, mixed aqueous solution of nickel sulfate (concentration: 98.5 g/L), cobalt sulfate (concentration: 14.3 g/L), manganese sulfate (concentration: 3.3 g/L), and magnesium sulfate (concentration: 1.0 g/L) was prepared as raw material aqueous solution of nickel composite hydroxide.

In example 1, a crystallization reaction vessel (Hereinafter, simply referred to as "vessel".) with stirrer and of volume 50 L mounted with four baffle plates was maintained at 50° C., and the vessel was charged with 7.2 L of pure water and 340 mL of 25 mass % ammonia aqueous solution. Then, while stirring it in the state that the vessel is maintained at 50° C., mixed aqueous solution was supplied to the vessel at 51.6 mL/min using metering pump, and also, 25 mass % ammonia aqueous solution was supplied at 5 mL/min as complexing agent. Further, in example 1, while supplying mixed aqueous solution and ammonia aqueous solution, 25 mass % sodium hydroxide aqueous solution was supplied to the vessel intermittently as neutralizing agent, and it was controlled such that pH on the basis of a liquid temperature of 25° C. was maintained at 11.6, and slurry of nickel composite hydroxide was obtained.

In example 1, after the end of supply of mixed aqueous solution, nickel composite hydroxide was solid-liquid separated from slurry of nickel composite hydroxide and washed by water. Then, nickel composite hydroxide was solid-liquid separated again from water washed nickel composite hydroxide, and dried to obtain powdery nickel composite hydroxide.

In example 1, obtained nickel composite hydroxide was maintained in air stream at 400° C. for 12 hours (oxidation roasting), and converted to nickel composite oxide.

In example 1, lithium hydroxide was weighed and mixed with obtained nickel composite oxide to be Li/Me=1.02 (u=0.02), and lithium mixture was obtained.

In example 1, obtained lithium mixture was calcined by maintaining it in oxygen stream (oxygen: 100 volume %) at 740° C. for 12 hours, and after cooling, positive electrode active material was obtained by disintegration. Crystallite diameter of obtained positive electrode active material was determined by calculation formula of Scherrer, from half-value breadth of (003) plane obtained from measurement by X-ray diffractometer (X'Pert PRO manufactured by PANalytical). In addition, in example 1, composition of positive electrode active material was confirmed by ICP emission spectral analysis.

In addition, production condition, measured composition, and crystallite diameter of obtained positive electrode active material is put together in table 1.

<2. Production and Evaluation of Each Battery>

Obtained positive electrode active material was evaluated by producing a 2032 type coin battery (Hereinafter, referred to as "coin type battery 1".) illustrated in FIG. 2 and a laminate type battery (Hereinafter, referred to as "laminate cell 2".) illustrated in FIG. 3, and by evaluating charge and discharge capacity and cycle characteristics by the coin type battery 1, and by evaluating high temperature storage characteristics by the laminate cell 2.

(2-1. Production of 2032 Type Coin Battery)

Figure 2:
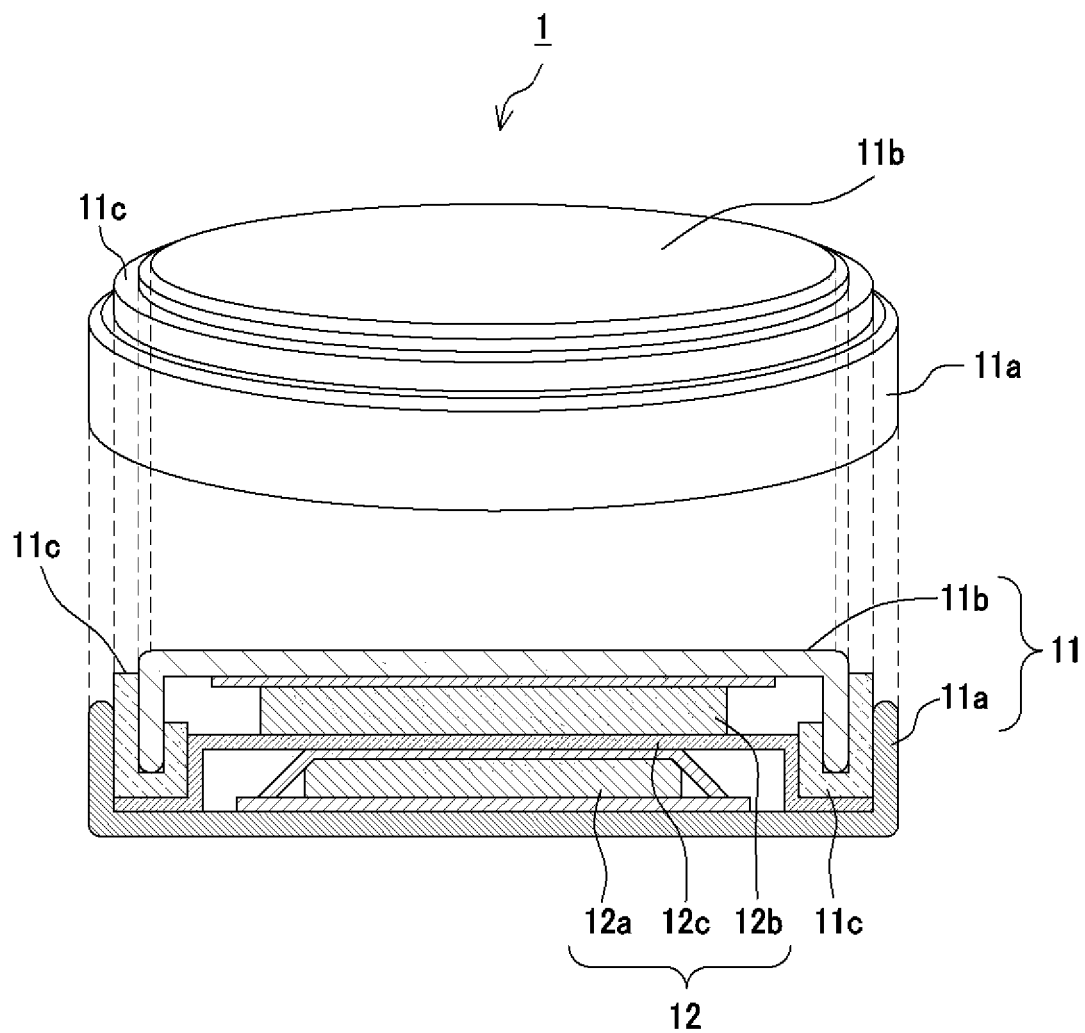
FIG. 2 is a schematic view of a coin type battery produced by using lithium nickel composite oxide applying the present invention, which is used for battery evaluation in example 1.

As illustrated in FIG. 2, the coin type battery 1 comprises a case 11 and an electrode 12 contained in the case 11. The case 11 comprises a positive electrode can 11a, which is hollow and one end of which is opened, and a negative electrode can 11b arranged at an opening of the positive electrode can 11a, and the case 11 is composed to form a space to contain the electrode 12 between the negative electrode can 11b and the positive electrode can 11a, when the negative electrode can 11b is arranged at the opening of the positive electrode can 11a. The electrode 12 comprises a positive electrode 12a, a separator 12c, and a negative electrode 12b, and they are laminated to be aligned in this order. The electrode 12 is contained in the case 11 such that the positive electrode 12a contacts an inner surface of the positive electrode can 11a, and that the negative electrode 12b contacts an inner surface of the negative electrode can 11b.

In addition, the case 11 comprises a gasket 11c, and relative movement of the positive electrode can 11a and the negative electrode can 11b is fixed to retain a noncontact state between the positive electrode can 11a and the negative electrode can 11b by the gasket 11c. Also, the gasket 11c is having a function to shut off inside of the case 11 from outside to be airtight and liquid-tight by sealing a gap between the positive electrode can 11a and the negative electrode can 11b.

In example 1, the coin type battery 1 was produced as below. At first, in example 1, 52.5 mg of positive electrode active material, 15 mg of acetylene black, and 7.5 mg of polytetrafluoroethylene (PTFE) resin were mixed, and press-formed to diameter 11 mm and thickness 100 μm at pressure of 100 MPa, to produce the positive electrode 12a. The produced positive electrode 12a was dried for 12 hours at 120° C. in a vacuum dryer. The coin type battery 1 was produced in a glove box of Ar atmosphere in which dew point was controlled to be −80° C., by using the positive electrode 12a, the negative electrode 12b, the separator 12c and electrolytic solution.

In addition, as the negative electrode 12b, a negative electrode sheet punched in disc shape with diameter of 14 mm and formed by copper foil applied with polyvinylidene fluoride and graphite powder with average particle diameter of about 20 μm was used. As the separator 12c, polyethylene porous film with film thickness 25 μm was used. As electrolytic solution, mixed solution with equal amount of diethyl carbonate (DEC) and ethylene carbonate (EC) with 1 M of $LiClO_4$ as supporting electrolyte (made by Fuji Chemicals Industrial Co., Ltd) was used.

(2-2. Measurement of Charge and Discharge Capacity)

In example 1, the produced coin type battery 1 was left for about 24 hours, and after open circuit voltage (OCV) has been stabilized, current density with respect to the positive electrode 12a was made to 0.5 mA/cm² to be charged until cutoff voltage of 4.3 V, which was regarded as initial charging capacity, and after stopped for one hour, capacity when discharged until cutoff voltage of 3.0 V was regarded as initial discharge capacity.

(2-3. Measurement of Cycle Characteristics)

In example 1, cycle characteristics was evaluated as follows. The coin type battery 1 was constant current charged until 4.4 V (charging voltage must be confirmed) with rate of 1 C at temperature of 25° C., and after stopped for 10 minutes, it was constant current discharged until 3.0 V with same rate, and charge and discharge cycle with stoppage of 10 minutes was repeated for 200 cycles. The discharge capacity of $1^{st}$ cycle and the discharge capacity of $200^{th}$ cycle were measured, and percentage of 2 C discharge capacity of $200^{th}$ cycle with respect to 2 C discharge capacity of $1^{st}$ cycle was calculated as capacity retention rate (%).

(2-4. Production of Laminate Type Battery)

Figure 3:
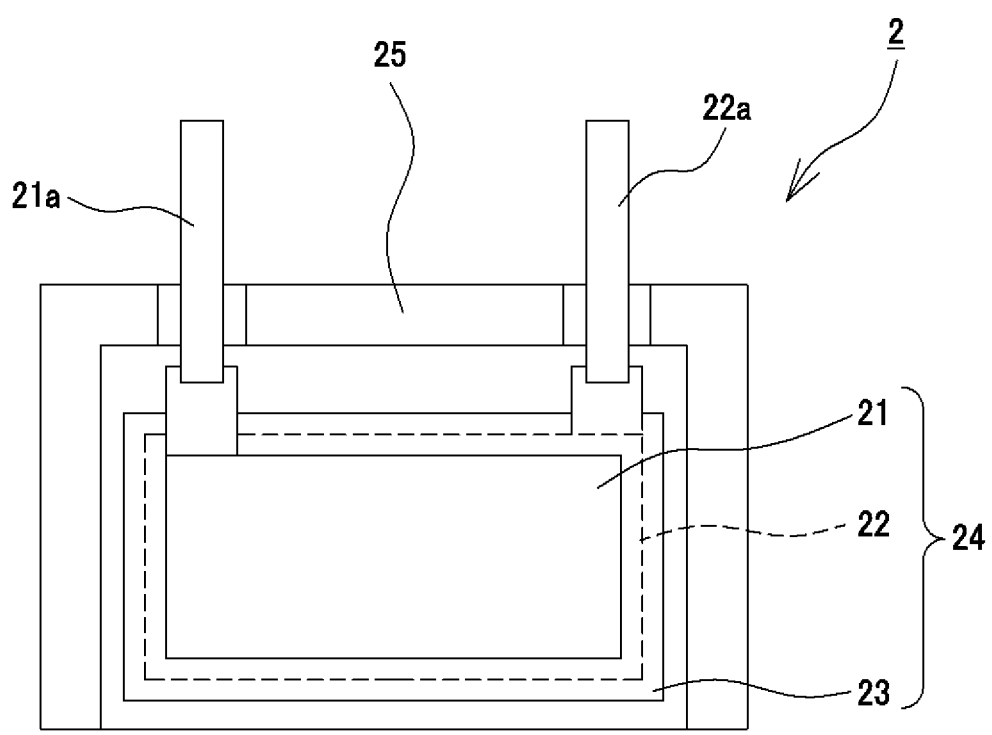
FIG. 3 is a schematic view of a laminate type battery produced by using lithium nickel composite oxide applying the present invention, which is used for battery evaluation in example 1.

In example 1, a laminate cell 2 with structure as illustrated in FIG. 3 was produced.

In example 1, at first, $LiNi_{0.5}Mn_{1.5}O_4$ which is a positive electrode active material, acetylene black which is a conductive material, and polyvinylidene fluoride (PVDF) which is a binder, were mixed to be 85:10:5 in mass ratio, and dispersed into N-methyl-2-pyrrolidone (NMP) to be slurry, and positive electrode slurry was obtained. This positive electrode slurry was coated on aluminum foil (positive electrode current collector) with thickness 20 μm by using applicator such that layer of positive electrode active material after drying would be 7 mg/cm² per unit area, and then, dried and roll pressed to produce a positive electrode sheet 21 (positive electrode) formed with positive electrode active material layer and having a positive electrode tab lead 21a.

In example 1, next, natural graphite which is a negative electrode active material and PVDF which is a binder were mixed to be 90:10 in mass ratio, and dispersed into NMP to be slurry, and negative electrode slurry was obtained. This negative electrode slurry was coated on copper foil (negative electrode current collector) with thickness 15 μm by using applicator such that layer of negative electrode active material after drying would be 1:1.6 in theoretical capacity ratio of positive electrode and negative electrode, and then, dried and roll pressed to produce a negative electrode sheet 22 (negative electrode) formed with negative electrode active material layer and having a negative electrode tab lead 22a.

In example 1, a separator 23 composed of microporous film (thickness 20.7 μm, porosity 43.9 volume %) made of polypropylene was inserted between the positive electrode sheet 21 and the negative electrode sheet 22 to form a three layered laminated sheet 24. The three layered laminated sheet 24 was interposed between twofold aluminum laminate film 25 (thickness 0.5 mm) and contained such that the positive electrode tab lead 21a and negative electrode tab lead 22a would be in a state to protrude from an edge of the aluminum laminate film 25.

Next, in Example 1, two sides of the aluminum laminate film 25 were sealed by heat seal. Then, after vacuum drawing inside of outer package of the laminate cell 2 from an opening of a remaining side, electrolytic solution (made by Ube Industries, Ltd.), in which $LiPF_6$ (1 mol/L) was dissolved in mixed solvent of ethylene carbonate and diethyl carbonate (capacity ratio 3:7), was injected for 500 μL, and then, the opening of the remaining side was also sealed by heat seal to produce the laminate cell 2. The size of the produced laminate cell 2 was of length 60 mm, width 90 mm, and thickness 550 μm.

(2-5. Measurement of High Temperature Storage Characteristics of Laminate Battery)

In example 1, high temperature storage characteristics was evaluated as follows. The laminate cell 2 was constant current constant voltage charged until cutoff voltage of 4.2 V with rate of 0.2 C to 0.02 C (constant current constant voltage charging: a charging process using two phase charging steps in which charging operates in constant current, and then, charging ends in constant voltage), and after 10 minutes stoppage, discharge capacity when constant current discharged until 2.5 V with rate of 0.2 C was measured.

Then, in example 1, the laminate cell 2 constant current constant voltage charged until cutoff voltage of 4.2 V with rate of 0.2 C to 0.02 C was stored for four weeks in a thermostatic tank of 60° C. Next, the laminate cell 2 after storage was moved to thermostatic tank of 25° C. to radiate heat, and then, constant current discharged until 2.5 V with rate of 0.2 C, and constant current constant voltage charged again until cutoff voltage of 4.2 V with rate of 0.2 C to 0.02 C, and after 10 minutes stoppage, discharge capacity when constant current discharged until 2.5 V with rate of 0.2 C was measured, and percentage of discharge capacity after storage with respect to discharge capacity before storage was calculated as capacity retention rate (%).

In addition, in example 1, evaluation results of electric characteristics of each battery produced by using the obtained positive electrode active material were illustrated respectively in Table 2.

Example 2

In example 2, the positive electrode active material was obtained as well as the example 1, except that mixed aqueous solution of nickel sulfate (concentration: 89.2 g/L), cobalt sulfate (concentration: 17.7 g/L), manganese sulfate (concentration: 5.5 g/L), and magnesium sulfate (concentration: 2.0 g/L) was used as raw material aqueous solution of nickel composite hydroxide, and that calcining temperature was changed to 760° C. In addition, in example 2, evaluation results about obtained positive electrode active material and about each battery produced using the obtained positive electrode active material were illustrated respectively in Tables 1 and 2.

Comparative Example 1

In comparative example 1, the positive electrode active material was obtained as well as the example 1, except that mixed aqueous solution of nickel sulfate (concentration: 99.8 g/L), cobalt sulfate (concentration: 14.2 g/L), and manganese sulfate (concentration: 3.3 g/L) was used as raw material aqueous solution of nickel composite hydroxide. In addition, in comparative example 1, evaluation results about obtained positive electrode active material and about each battery produced using the obtained positive electrode active material were illustrated respectively in Tables 1 and 2.

Comparative Example 2

In comparative example 2, the positive electrode active material was obtained as well as the example 1, except that oxidation roasting temperature was changed to 600° C. In addition, in comparative example 2, evaluation results about obtained positive electrode active material and about each battery produced using the obtained positive electrode active material were illustrated respectively in Tables 1 and 2.

Comparative Example 3

In comparative example 3, the positive electrode active material was obtained as well as the example 1, except that calcining temperature was changed to 700° C. In addition, in comparative example 3, evaluation results about obtained positive electrode active material and about each battery produced using the obtained positive electrode active material were illustrated respectively in Tables 1 and 2.

Comparative Example 4

In comparative example 4, the positive electrode active material was obtained as well as the example 1, except that calcining temperature was changed to 800° C. In addition, in comparative example 4, evaluation results about obtained positive electrode active material and about each battery produced using the obtained positive electrode active material were illustrated respectively in Tables 1 and 2.

Comparative Example 5

In comparative example 5, the positive electrode active material was obtained as well as the example 1, except that it was adjusted to be Li/Me=1.01 (u=0.01). In addition, in comparative example 5, evaluation results about obtained positive electrode active material and about each battery produced using the obtained positive electrode active material were illustrated respectively in Tables 1 and 2.

Comparative Example 6

In comparative example 6, the positive electrode active material was obtained as well as example 1, except that it was adjusted to be Li/Me=1.04 (u=0.04). In addition, in comparative example 6, evaluation results about obtained positive electrode active material and about each battery produced using the obtained positive electrode active material were illustrated respectively in Tables 1 and 2.

TABLE 2-continued

|  | Initial discharge capacity (mAh/g) | Cycle characteristics (%) | High temperature storage characteristics (%) |
|---|---|---|---|
| Comparative example 4 | 179 | 83 | 85 |
| Comparative example 5 | 205 | 78 | 87 |
| Comparative example 6 | 185 | 86 | 88 |

As illustrated in Tables 1 and 2, in examples 1 and 2, lithium nickel composite oxide represented by a general formula (1): $Li_{1+u}Ni_{1-x-y-z}Co_xMn_yMg_zO_2$ (However, u, x, y and z in the formula satisfies $0.015 \leq u \leq 0.030$, $0.05 \leq x \leq 0.20$, $0.01 \leq y \leq 0.10$, $0.01 \leq z \leq 0.05$, $0.10 \leq x+y+z \leq 0.25$.) was produced. On the other hand, in comparative example 1, magnesium was not included in composition component. As a result of evaluating high temperature storage characteristics when applying lithium nickel composite oxide of examples 1 and 2, and comparative example 1 to the laminate cell 2, high temperature storage characteristics was decreased significantly in comparative example 1. Therefore, from these results, it has been clarified that high temperature storage characteristics of positive electrode active material would be improved by including magnesium in composition component of lithium nickel composite oxide.

As illustrated in Tables 1 and 2, in examples 1 and 2, temperature at the time of oxidation roasting was 300° C. to 500° C., but in comparative example 2, oxidation roasting was performed in temperature more than 500° C. As a result of evaluating crystallite diameter of lithium nickel composite oxide of examples 1 and 2, and comparative example 2, in examples 1 and 2, crystallite diameter was 100 nm to 130 nm (1000 Å to 1300 Å), but in comparative example 2, crystallite diameter was less than 100 nm (1000 Å), so crystallinity was decreased, and initial discharge capacity and cycle characteristics were deteriorated. Therefore, from these results, it has been clarified that battery characteristic could be improved by excellent crystallinity, as crystallite diameter could be 100 nm to 130 nm (1000 Å to 1300 Å) by setting temperature at the time of oxidation roasting to be 300° C. to 500° C.

TABLE 1

|  | Composition | Oxidation roasting (° C.) | Calcining temperature (° C.) | Li/Me | Crystallite diameter (Å) |
|---|---|---|---|---|---|
| Example 1 | $Li_{1.02}Ni_{0.83}Co_{0.12}Mn_{0.03}Mg_{0.02}$ | 400 | 740 | 1.02 | 1143 |
| Example 2 | $Li_{1.02}Ni_{0.76}Co_{0.15}Mn_{0.05}Mg_{0.04}$ | 400 | 760 | 1.02 | 1218 |
| Comparative example 1 | $Li_{1.02}Ni_{0.85}Co_{0.12}Mn_{0.03}$ | 400 | 740 | 1.02 | 1053 |
| Comparative example 2 | $Li_{1.02}Ni_{0.83}Co_{0.12}Mn_{0.03}Mg_{0.02}$ | 600 | 740 | 1.02 | 980 |
| Comparative example 3 | $Li_{1.02}Ni_{0.83}Co_{0.12}Mn_{0.03}Mg_{0.02}$ | 400 | 700 | 1.02 | 912 |
| Comparative example 4 | $Li_{1.02}Ni_{0.83}Co_{0.12}Mn_{0.03}Mg_{0.02}$ | 400 | 800 | 1.02 | 1860 |
| Comparative example 5 | $Li_{1.01}Ni_{0.83}Co_{0.12}Mn_{0.03}Mg_{0.02}$ | 400 | 740 | 1.01 | 1027 |
| Comparative example 6 | $Li_{1.04}Ni_{0.83}Co_{0.12}Mn_{0.03}Mg_{0.02}$ | 400 | 740 | 1.04 | 1513 |

TABLE 2

|  | Initial discharge capacity (mAh/g) | Cycle characteristics (%) | High temperature storage characteristics (%) |
|---|---|---|---|
| Example 1 | 202 | 88 | 90 |
| Example 2 | 191 | 90 | 92 |
| Comparative example 1 | 212 | 87 | 77 |
| Comparative example 2 | 186 | 84 | 89 |
| Comparative example 3 | 182 | 84 | 84 |

As illustrated in Tables 1 and 2, in examples 1 and 2, temperature at the time of calcining was 720° C. to 780° C., but in comparative example 3, temperature at the time of calcining was less than 720° C., and in comparative example 4, temperature at the time of calcining was more than 780° C. As a result of evaluating crystallite diameter of lithium nickel composite oxide of examples 1 and 2, and comparative examples 3 and 4, in examples 1 and 2, crystallite diameter was 100 nm to 130 nm (1000 Å to 1300 Å), but in comparative example 3, crystallite diameter was less than 100 nm (1000 Å), and in comparative example 4, crystallite diameter was more than 130 nm (1300 Å), so crystallinity was decreased, and initial discharge capacity, cycle characteristics, and high temperature storage characteristics were deteriorated in either case. Therefore, from these results, it has been clarified that battery characteristic could be improved by excellent crystallinity, as crystallite diameter could be 100 nm to 130 nm (1000 Å to 1300 Å) by setting temperature at the time of calcining to be 720° C. to 780° C.

As illustrated in Tables 1 and 2, in examples 1 and 2, at the time of mixing of raw material, a ratio (Li/Me) of a number of atoms of lithium (Li) to a sum of number of atoms of nickel, cobalt, manganese and magnesium (Me) was 1.015 to 1.030, but in comparative example 5, Li/Me was less than 1.015, and in comparative example 6, Li/Me was more than 1.030. Regarding composition ratio of lithium nickel composite oxide of examples 1 and 2, and comparative examples 5 and 6, in examples 1 and 2, u indicating excess amount of lithium was 0.015≤u≤0.030, but in comparative example 5, u was less than 0.015, and in comparative example 6, u was more than 0.030. As a result of evaluating initial discharge capacity and cycle characteristics when applying lithium nickel composite oxide of examples 1 and 2, and comparative examples 5 and 6, to the coin type battery 1, it has been clarified that comparative examples 5 and 6 were difficult to achieve both high capacity and high cycle characteristics.

Glossary of Drawing References

1 Coin type battery
11 Case
11a Positive electrode can
11b Negative electrode can
11c Gasket
12 Electrode
12a Positive electrode
12b Negative electrode
12c Separator
2 Laminate cell
21 Positive electrode sheet
21a Positive electrode tab lead
22 Negative electrode sheet
22a Negative electrode tab lead
23 Separator
24 Three layered laminated sheet
25 Aluminum laminate film

The invention claimed is:

1. A positive electrode active material for non-aqueous electrolyte secondary battery comprising lithium nickel composite oxide,
wherein the lithium nickel composite oxide comprises primary particles having layered structure and secondary particles composed of aggregates of the primary particles, and is represented by a general formula (1): $Li_{1+u}Ni_{1-x-y-z}Co_xMn_yMg_zO_2$ where u, x, y and z in the formula satisfies $0.015 \leq u \leq 0.030$, $0.05 \leq x \leq 0.20$, $0.01 \leq y \leq 0.10$, $0.01 \leq z \leq 0.05$, $0.10 < x+y+z \leq 0.25$, and
wherein the lithium nickel composite oxide has a crystallite diameter in a range of 100 nm to 130 nm.

2. The positive electrode active material for non-aqueous electrolyte secondary battery according to claim 1, wherein the positive electrode active material has an average particle diameter in a range of 5 μm to 20 μm on a volume basis by laser diffraction scattering method.

3. A non-aqueous electrolyte secondary battery comprising a positive electrode comprising the positive electrode active material according to claim 2.

4. A non-aqueous electrolyte secondary battery comprising a positive electrode comprising the positive electrode active material according to claim 1.

5. A process for producing a positive electrode active material for non-aqueous electrolyte secondary battery, comprising:
an oxidation roasting step for obtaining nickel composite oxide by oxidation roasting nickel composite hydroxide represented by a general formula (2): $Ni_{1-a-b-c}Co_aMn_bMg_c(OH)_2$ where a, b and c in the formula satisfies $0.05 \leq a \leq 0.20$, $0.01 \leq b \leq 0.10$, $0.01 \leq c \leq 0.05$, $0.10 < a+b+c \leq 0.25$, at temperature of 300° C. to 500° C. in an oxidizing atmosphere;
a mixing step for obtaining a lithium mixture in which a ratio (Li/Me) of a number of atoms of lithium (Li) to a sum of number of atoms of nickel, cobalt, manganese and magnesium (Me) is 1.015 to 1.030, by mixing the nickel composite oxide obtained in the oxidation roasting step with lithium compound; and
a calcining step for obtaining a lithium nickel composite oxide by calcining the lithium mixture obtained in the mixing step at temperature of 720° C. to 780° C. in an oxidizing atmosphere; wherein
the lithium nickel composite oxide comprises primary particles having layered structure and secondary particles composed of aggregates of the primary particles, and
the lithium nickel composite oxide has a crystallite diameter in the range of 100 nm to 130 nm.

6. The process for producing the positive electrode active material for non-aqueous electrolyte secondary battery according to claim 5, further comprising
a crystallization step for obtaining the nickel composite hydroxide by neutralization crystallization, by mixing alkaline aqueous solution with metal salt aqueous solution including nickel, cobalt, manganese and magnesium, before the oxidation roasting step.

7. The process for producing the positive electrode active material for non-aqueous electrolyte secondary battery according to claim 6, wherein a mixed aqueous solution is prepared by mixing metal salt aqueous solution including nickel, cobalt, manganese and magnesium in advance, and obtained the mixed aqueous solution is mixed with alkaline aqueous solution in the crystallization step.

8. The process for producing the positive electrode active material for non-aqueous electrolyte secondary battery according to claim 7, wherein lithium hydroxide, lithium carbonate or a mixture thereof is used as the lithium compound in the mixing step.

9. The process for producing the positive electrode active material for non-aqueous electrolyte secondary battery according to claim 6, wherein lithium hydroxide, lithium carbonate or a mixture thereof is used as the lithium compound in the mixing step.

10. The process for producing the positive electrode active material for non-aqueous electrolyte secondary battery according to claim 5, wherein lithium hydroxide, lithium carbonate or a mixture thereof is used as the lithium compound in the mixing step.

* * * * *